United States Patent
Ishii et al.

(10) Patent No.: US 8,050,202 B2
(45) Date of Patent: Nov. 1, 2011

(54) MOBILE COMMUNICATION METHOD, MOBILE STATION, AND RADIO BASE STATION

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/995,061

(22) PCT Filed: May 29, 2009

(86) PCT No.: PCT/JP2009/059852
§ 371 (c)(1),
(2), (4) Date: Feb. 17, 2011

(87) PCT Pub. No.: WO2009/145292
PCT Pub. Date: Dec. 3, 2009

(65) Prior Publication Data
US 2011/0128931 A1    Jun. 2, 2011

(30) Foreign Application Priority Data
May 29, 2008  (JP) ................................ 2008-141736

(51) Int. Cl.
*H04B 1/44* (2006.01)
(52) U.S. Cl. ........................................................ 370/282
(58) Field of Classification Search ........................ None
See application file for complete search history.

(56) References Cited

U.S. PATENT DOCUMENTS

| 7,417,966 B2 * | 8/2008 | Kalden et al. ................. 370/329 |
| 7,974,177 B2 * | 7/2011 | Ofuji et al. .................... 370/203 |
| 2009/0268693 A1 * | 10/2009 | Lindh et al. .................. 370/336 |

OTHER PUBLICATIONS

Extended European Search Report Application No. 09754800.2 dated Jun. 14, 2011 (7 pages).
Japanese Office Action for Application No. 2008-141736, mailed on Apr. 6, 2010 (6 pages).
Japanese Office Action for Application No. 2008-141736, mailed on Jan. 19, 2010 (7 pages).
International Search Report w/translation from PCT/JP2009/059582 dated Jul. 28, 2009 (2 pages).
3GPP TSG RAN WG2 #62, R2-082485; "UL ACK/NACK Resource Allocation for DL Semi-Persistent Scheduling"; NTT Docomo, Inc.; Kansas City, Missouri; May 5-9, 2008 (4 pages).
3GPP TSG RAN WG2 Meeting #62, R2-082798; "Semi-Persistent Scheduling Activation with Single PDCCH"; Qualcomm Europe; Shenzhen, China; Mar. 31-Apr. 4, 2008 (2 pages).
3GPP TSG RAN WG1 Meeting #51bis, R1-080035; "Joint Proposal on Uplink ACK/NACK Channelization"; Samsung et al.; Sevilla, Spain; Jan. 14-18, 2008 (6 pages).

(Continued)

*Primary Examiner* — Raj Jain
(74) *Attorney, Agent, or Firm* — Osha • Liang LLP

(57) ABSTRACT

A radio resource selecting method according to the present invention semi-persistently selects a radio resource to be allocated to an uplink acknowledgement signal indicating a reception state of a persistently allocated downlink signal from a plurality of radio resources defined by frequencies and codes, and includes the steps of: (A) selecting candidates for an allocation radio resource to be allocated to the uplink acknowledgement signal from the plurality of radio resources; (B) notifying candidate information on the selected candidates for the allocation radio resource; and (C) selecting a single allocation radio resource from the plurality of candidates for the allocation radio resource indicated in the candidate information notified in the step (B).

14 Claims, 7 Drawing Sheets

OTHER PUBLICATIONS

3GPP TS 36.213 V8.1.0; "3rd Generation Partnership Project; Technical Specification Group Radio Access Network; Evolved Universal Terrestrial Radio Access (E-UTRA); Physical layer procedures"; Nov. 2007 (17 pages).

3GPP TS 36.211 V8.1.0; "3rd Generation Partnership Project; Technical Specification Group Radio Access Network; Evolved Universal Terrestrial Radio Access (E-UTRA); Physical Channels and Modulation"; Nov. 2007 (54 pages).

3GPP TS 36.300 V8.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description"; Dec. 2007 (121 pages).

Japanese Office Action for Application No. 2008-141736, mailed on Apr. 6, 2010 (6 pages).

Japanese Office Action for Application No. 2008-141736, mailed on Jan. 19, 2010 (7 pages).

PDCCH Contents, 3GPP TSG RAN WG1 Meeting #52bis, R1-081525, URL http://www.3gpp.org/ftp/tsg_ran/WG1_RL1/TSGR1_52bb/Docs/ dated Mar. 30, 2008 (7 pages).

* cited by examiner

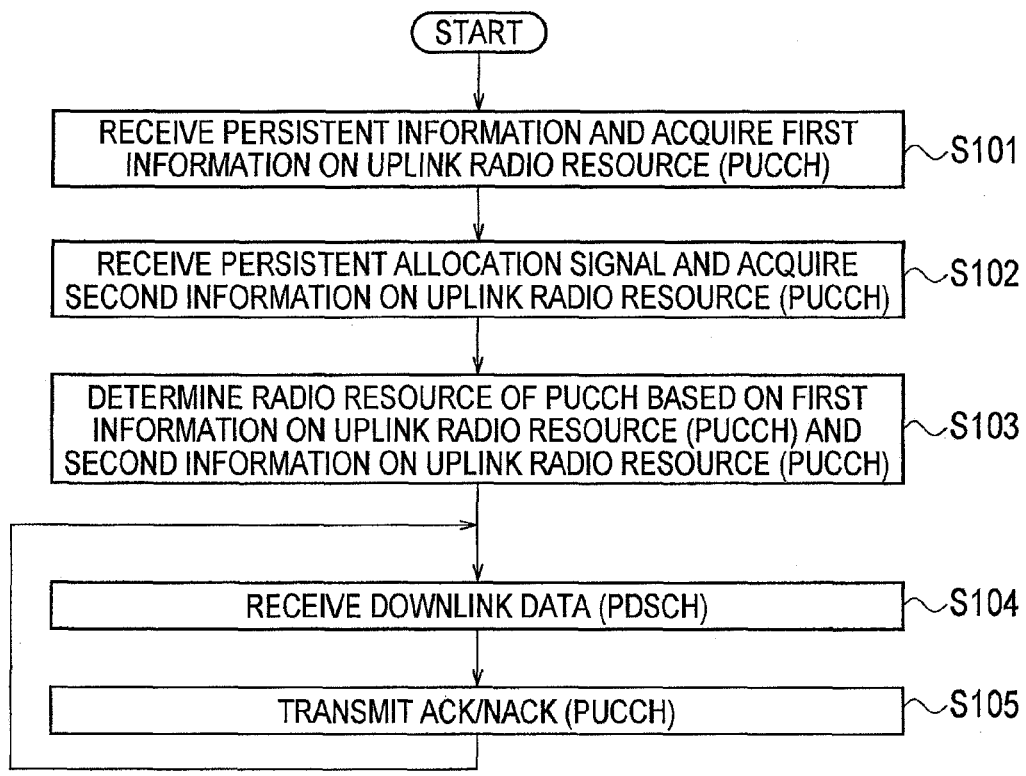
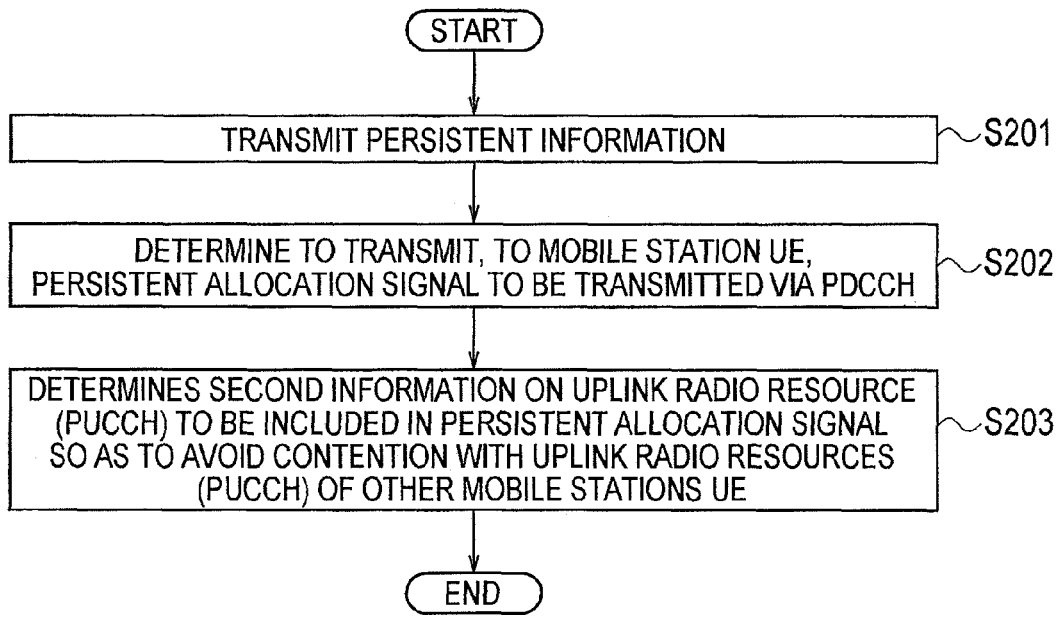

MOBILE COMMUNICATION METHOD, MOBILE STATION, AND RADIO BASE STATION

TECHNICAL FIELD

The present invention relates to a mobile communication method in which a mobile station starts a reception of downlink data, transmitted from a radio base station, by using a downlink radio resource persistently allocated in first cycles, at a first allocation starting time, and transmits acknowledgement information for the downlink data by using a persistently allocated uplink radio resource, and relates to the mobile station and the radio base station.

BACKGROUND ART

A communication method as a successor of the W-CDMA scheme and the HSDPA scheme, namely, the LTE (Long Term Evolution) scheme has been considered by the W-CDMA standardization organization 3GPP, and the specification setting work is underway.

As a radio access scheme of the LTE scheme, use of the OFDMA in the downlink and the SC-FDMA (Single-Carrier Frequency Division Multiple Access) in the uplink is under consideration.

The OFDMA is a scheme for dividing a frequency band into plural narrow frequency bands (sub-carriers) and transmitting data loaded on the respective divided frequency bands. In this scheme, high-speed transmission is achieved and frequency utilization efficiency is improved by arranging sub-carriers densely on the frequency bands in such a manner that the sub-carriers partially overlap but do not interfere with each other.

The SC-FDMA is a transmission scheme which reduces interference between terminals by dividing a frequency band and transmitting data by using frequency bands different among plural terminals. The SC-FDMA has a feature of less fluctuation in the transmission power, which achieves low power consumption and wide coverage of terminals.

The LTE scheme is a system in which plural mobile stations perform communication by sharing one or more physical channels in both uplink and downlink.

A channel shared by plural mobile stations is generally called a shared channel, which is, in the LTE scheme, a "Physical Uplink Shared Channel (PUSCH)" in the uplink and a "Physical Downlink Shared Channel (PDSCH)" in the downlink.

Also, such a shared channel is, as a transport channel, an "Uplink Shared Channel (UL-SCH)" in the uplink and a "Downlink Shared Channel (DL-SCH)" in the downlink.

In such a communication system using shared channels as described above, it is necessary to select mobile station UE to which the shared channel is to be allocated, and to transmit, to the selected mobile station UE, a signal indicating the allocation of the shared channel, for each sub-frame (1 ms, in the LTE scheme).

In the LTE scheme, a control channel used for the signaling is called the "Physical Downlink Control Channel (PDCCH)" or "Downlink L1/L2 Control Channel (DL L1/L2 Control Channel)".

Meanwhile, the processing for each sub-frame of selecting mobile station UE to which the shared channel is to be allocated is generally called the "scheduling". In this case, the processing may also be called the "dynamic scheduling", because the mobile station UE to which the shared channel is allocated is dynamically selected for each sub-frame. Furthermore, "allocating the shared channel" described above may be alternatively expressed as "allocating a radio resource for the shared channel".

Information of the physical downlink control channel includes, for example, the "downlink scheduling information", "the uplink scheduling grant", and the like.

The downlink scheduling information includes, for example, downlink resource block allocation information, ID of UE, the number of streams, information on the precoding vector, data size, modulation scheme, information on the HARQ (hybrid automatic repeat request), and the like, on the downlink shared channel.

Meanwhile, the "uplink scheduling grant" includes, for example, uplink resource block allocation information, ID of UE, data size, modulation scheme, uplink transmission power information, information on demodulation reference signal in the uplink MIMO, and the like, on the uplink shared channel.

Note that, the "downlink scheduling information" and the "uplink scheduling grant" described above may be collectively referred to as "downlink control information (DCI)".

In the LTE scheme, the HARQ is applied to a communication using the shared channel described above. For example, on the downlink, the mobile station UE decodes the downlink shared channel, and transmits, to the radio base station eNB, acknowledgement information (ACK/NACK) based on the decoding result (CRC check result) by using the physical uplink control channel (PUCCH).

Then, the radio base station eNB performs retransmission control according to a content of the acknowledgement information, which is expressed either with a positive response (ACK) indicating that the transmitted signal is received properly or a negative response (NACK) indicating that the transmitted signal is not received properly.

FIG. 8 shows the downlink dynamic scheduling and the HARQ processing in a mobile communication system of the LTE scheme described above.

In the sub-frame #3, the radio base station eNB transmits, to the mobile station UE, downlink scheduling information via a PDCCH and downlink data via a PDSCH.

Then, the mobile station UE receives downlink data via the PDSCH, on the basis of the downlink scheduling information received via the PDCCH.

In the sub-frame #7, the mobile station UE transmits the acknowledgement information for the downlink data using a PUCCH, and the radio base station eNB receives the acknowledgement information (ACK/NACK) mapped to the PUCCH.

The radio resource of the PDSCH described above is dynamically allocated as being notified by the PDCCH. Also, the radio resource of the PUCCH described above is associated with the radio resource number of the PDCCH described above. Dynamic allocation of such radio resource of the PDCCH also results in dynamic allocation of such radio resource of the PUCCH.

That is, in the normal downlink scheduling (dynamic scheduling) of a mobile communication system of the LTE scheme, the radio base station eNB is configured to dynamically allocate a downlink radio resource and an uplink radio resource to the mobile station UE through the PDCCH, the downlink radio resource being for transmitting downlink data to the mobile station UE, the uplink radio resource being for transmitting acknowledgement information for the downlink data.

Furthermore, in the dynamic scheduling described above, a time difference between a sub-frame from which a PUCCH signal is transmitted and a sub-frame from which a PDCCH signal and a PDSCH signal are transmitted is fixed.

On the other hand, in the "persistent scheduling" that is under consideration to achieve the VoIP and the like, the radio base station eNB is configured to start a persistent allocation of the downlink radio resource (PDSCH) to a mobile station in the first cycles, at a sub-frame (first allocation starting time) in which the downlink scheduling information is transmitted to the mobile station UE through the PDCCH, and to persistently allocate the uplink radio resource (PUCCH) to the mobile station UE through the upper layer (Radio Resource Control: RRC) signaling.

In the "persistent scheduling", the downlink scheduling information is transmitted via the PDCCH in a first transmission only, and the downlink scheduling information is not transmitted via the PDCCH in the subsequent transmissions. For this reason, the method for associating a radio resource of the PUCCH with a radio resource number of the PDCCH cannot be applied unlike the "dynamic scheduling" described above.

Accordingly, the uplink radio resource (PUCCH) in the "persistent scheduling" is persistently allocated to the mobile station UE by using the upper layer (RRC) signaling.

Here, the uplink radio resource represents, for example, a code resource in the code multiplexing or a frequency resource in the frequency multiplexing.

The frequency resource may be designated by a resource block number of a resource block (set of sub-carriers) from which the PUCCH is transmitted.

Furthermore, when a plurality of acknowledgement information are multiplexed within one resource block, the uplink radio resource may be designated by a predetermined identification number. For example, an identification number may be used to designate an amount of cyclic shift in the multiplexing of CAZAC sequence cyclic shift or an orthogonal cover code in the block spreading.

Furthermore, generally in the HARQ, a time difference between a time point where the above-described downlink radio resource (PDSCH) is allocated and a time point where the above-described uplink radio resource (PUCCH) is allocated is fixed. Accordingly, a transmission timing of the PUCCH is uniquely determined by designating a first allocation starting time through the PDCCH.

In the example shown in FIG. 9, the downlink radio resource (PDSCH) described above are persistently allocated in cycles of 20 ms, and the uplink radio resource (PUCCH) described above is persistently allocated for each downlink radio resource (PDSCH).

Specifically, the downlink radio resource (PDSCH) is persistently allocated in the sub-frames #3, #23, . . . while the acknowledgement information is transmitted in the sub-frames #7, #27, . . . .

Note that, in the sub-frame #3 of the example shown in FIG. 9, a first allocation starting time is designated by the PDCCH.

SUMMARY OF THE INVENTION

Problems to be Solved by the Invention

Here, in the prior art, a time difference between a time point where the downlink radio resource (PDSCH) described above is allocated and a time point where the uplink radio resource (PUCCH) described above is allocated, is specified as a predetermined period of time (for example, four sub-frames).

Accordingly, when a timing of the downlink radio resource (PDSCH) allocated in the "persistent scheduling" is changed, a timing at which the uplink radio resource (PUCCH) is allocated is also changed similarly.

Note that, in the persistent scheduling, the uplink radio resource (PUCCH) such as a code resource in the code multiplexing and a frequency resource in the frequency multiplexing is persistently allocated to the mobile station UE by using the upper layer signaling as described above. For this reason, even in the case where a timing at which the uplink radio resource (PUCCH) is allocated is changed, the uplink radio resource (PUCCH) such as the code resource and the frequency resource is not changed.

At this time, if the uplink radio resource (PUCCH) allocated at a changed timing is already used by another mobile station UE, the uplink radio resource (PUCCH) after the change contends with the uplink radio resource (PUCCH) of the another mobile station UE. Thus, there has been a problem that the process of changing the timing of the downlink radio resource (PDSCH) allocated in the "persistent scheduling" described above cannot be performed.

In other words, there has been a problem that a timing of the downlink radio resource (PDSCH) allocated in the "persistent scheduling" cannot be changed freely, since a time difference between a time point where the above-described downlink radio resource (PDSCH) is allocated and a time point where the above-described uplink radio resource (PUCCH) is allocated is fixed, and the uplink radio resource (PUCCH) is set in advance.

Accordingly, the present invention has been made to solve the above problems. An object of the present invention is to provide a mobile communication method, a mobile station and a radio base station which are capable of flexibly setting a timing of a downlink radio resource (PDSCH) allocated in "persistent scheduling".

DISCLOSURE OF THE INVENTION

A first aspect of the present invention is summarized as a mobile communication method in which a mobile station starts a reception of downlink data, transmitted from a radio base station, by using a downlink radio resource persistently allocated in first cycles, at a first allocation starting time, and transmits acknowledgement information for the downlink data by using a persistently allocated uplink radio resource, the mobile communication method including the steps of: (A) notifying, from the radio base station to the mobile station, the first cycle and first information on the uplink radio resource; and (B) determining, at the mobile station, the first allocation starting time, starting a reception of the downlink data via the downlink radio resource at the first allocation starting time, and transmitting the acknowledgement information via the uplink radio resource, when receiving a persistent allocation signal from the radio base station; wherein, in the step (B), the uplink radio resource is determined based on the first information on the uplink radio resource and second information on the uplink radio resource included in the persistent allocation signal; and the acknowledgement information is transmitted via the determined uplink radio resource.

In the first aspect, in the step (A), the first information on the uplink radio resource can be an identification number of a resource block, an orthogonal cover sequence number in a block spreading, or an identification number designating an amount of cyclic shift in a CAZAC sequence.

In the first aspect, a part of information on the uplink radio resource can be notified by the first information on the uplink radio resource; and a rest of information on the uplink radio resource is notified by the second information on the uplink radio resource.

In the first aspect, the first information on the uplink radio resource can be an identification number of a resource block;

and the second information on the uplink radio resource can be an orthogonal cover sequence number in a block spreading and an amount of cyclic shift in a CAZAC sequence.

In the first aspect, in the step (B), the second information on the uplink radio resource can be notified by a power control command in a dynamic allocation signal to be used in a scheduling in which a downlink radio resource is dynamically allocated or a bit designating a redundancy version of HARQ, when a signal format of the persistent allocation signal is the same as a signal format of the dynamic allocation signal.

A second aspect of the present invention is summarized as a mobile station configured to start a reception of downlink data, transmitted from a radio base station, by using a downlink radio resource persistently allocated in first cycles, at a first allocation starting time, and to transmit acknowledgement information for the downlink data by using a persistently allocated uplink radio resource, the mobile station including: a persistent communication information receiving unit configured to receive the first cycle and first information on the uplink radio resource from the radio base station; and a communication unit configured to determine the first allocation starting time, to start a reception of the downlink data via the downlink radio resource at the first allocation starting time, and to transmit the acknowledgement information via the uplink radio resource, when receiving a persistent allocation signal from the radio base station; wherein the communication unit is configured to determine the uplink radio resource based on the first information on the uplink radio resource and second information on the uplink radio resource included in the persistent allocation signal, and to transmit the acknowledgement information via the determined uplink radio resource.

In the second aspect, the first information on the uplink radio resource can be an identification number of a resource block, an orthogonal cover sequence number in a block spreading, or an identification number designating an amount of cyclic shift in a CAZAC sequence.

In the second aspect, a part of information on the uplink radio resource can be notified by the first information on the uplink radio resource; and a rest of information on the uplink radio resource is notified by the second information on the uplink radio resource.

In the second aspect, the first information on the uplink radio resource can be an identification number of a resource block; and the second information on the uplink radio resource can be an orthogonal cover sequence number in a block spreading and an amount of cyclic shift in a CAZAC sequence.

In the second aspect, the communication unit can be configured to acquire the second information on the uplink radio resource based on a power control command in a dynamic allocation signal to be used in a scheduling in which a downlink radio resource is dynamically allocated or a bit designating a redundancy version of HARQ, when a signal format of the persistent allocation signal is the same as a signal format of the dynamic allocation signal.

A third aspect of the present invention is summarized as a radio base station used in a mobile communication system in which a mobile station starts a reception of downlink data, transmitted from the radio base station, by using a downlink radio resource persistently allocated in first cycles, at a first allocation starting time, and transmits acknowledgement information for the downlink data by using a persistently allocated uplink radio resource, the radio base station including: a persistent communication information transmitting unit configured to notify, to the mobile station, the first cycle and first information on the uplink radio resource; a persistent allocation signal transmitting unit configured to transmit a persistent allocation signal to the mobile station; and a communication unit configured to start a transmission of the downlink data via the downlink radio resource at the first allocation starting time to be determined by the persistent allocation signal, and to receive the acknowledgement information via the uplink radio resource; wherein the communication unit is configured to determine the uplink radio resource based on the first information on the uplink radio resource and second information on the uplink radio resource included in the persistent allocation signal and to receive the acknowledgement information via the determined uplink radio resource.

In the third aspect, in the step (A), the first information on the uplink radio resource can be an identification number of a resource block, an orthogonal cover sequence number in a block spreading, or an identification number designating an amount of cyclic shift in a CAZAC sequence.

In the third aspect, a part of information on the uplink radio resource can be notified by the first information on the uplink radio resource; and a rest of information on the uplink radio resource is notified by the second information on the uplink radio resource.

In the third aspect, the first information on the uplink radio resource can be an identification number of a resource block; and the second information on the uplink radio resource can be an orthogonal cover sequence number in a block spreading and an amount of cyclic shift in a CAZAC sequence.

In the third aspect, the communication unit can be configured to notify the second information on the uplink radio resource by a power control command in a dynamic allocation signal to be used in a scheduling in which a downlink radio resource is dynamically allocated or a bit designating a redundancy version of HARQ, when a signal format of the persistent allocation signal is the same as a signal format of the dynamic allocation signal.

In the third aspect, the persistent allocation signal transmitting unit is configured to set the second information on the uplink radio resource in such a manner that the uplink radio resource does not contend with a uplink radio resource allocated to another mobile station.

A fourth aspect of the present invention is summarized as a radio resource selecting method of semi-persistently selecting a radio resource to be allocated to an uplink acknowledgement signal indicating a reception state of a persistently allocated downlink signal from a plurality of radio resources defined by frequencies and codes, the radio resource selecting method including the steps of: (A) selecting candidates for an allocation radio resource to be allocated to the uplink acknowledgement signal from the plurality of radio resources; (B) notifying candidate information on the selected candidates for the allocation radio resource; and (C) selecting a single allocation radio resource from the plurality of candidates for the allocation radio resource indicated in the candidate information notified in the step (B).

In the fourth aspect, in the step (C), an unused allocation radio resource can be selected from the plurality of candidates for the allocation radio resource.

In the fourth aspect, the radio resource selecting method according can further include the step of: (D) notifying designation information on a single allocation radio resource among the plurality of candidates for the allocation radio resource, and, in the step (C), the single allocation radio resource related to the designation information notified in the step (D) can be selected from the plurality of candidates for the allocation radio resource indicated in the candidate information notified in the step (B).

A fifth aspect of the present invention is summarized as a radio base station configured to semi-persistently select a radio resource to be allocated to an uplink acknowledgement signal indicating a reception state of a persistently allocated downlink signal from a plurality of radio resources defined by frequencies and codes, the radio base station including: a candidate selector unit configured to select candidates for an allocation radio resource to be allocated to the uplink acknowledgement signal from the plurality of radio resources; and a candidate notification unit configured to notify candidate information on the selected candidates for the allocation radio resource.

In the fifth aspect, the radio base station can further include: a selector unit configured to select a single allocation radio resource from the plurality of candidates for the allocation radio resource; and a designation information notification unit configured to notify designation information on the selected single allocation radio resource.

A sixth aspect of the present invention is summarized as a mobile station used in a mobile communication system in which a radio base station semi-persistently selects a radio resource to be allocated to an uplink acknowledgement signal indicating a reception state of a persistently allocated downlink signal from a plurality of radio resources defined by frequencies and codes, the mobile station including: a candidate information receiver unit configured to receive candidate information on candidates for allocation radio resource from the radio base station; and a radio resource selector unit configured to select a single allocation radio resource from the plurality of candidates for the allocation radio resource indicated in the received candidate information.

In the sixth aspect, the radio resource selector unit can be configured to select an unused allocation radio resource from the plurality of candidates for the allocation radio resource.

In the sixth aspect, the mobile station can further include a designation information receiver unit configured to receive designation information on the single allocation radio resource among the plurality of candidates for the allocation radio resource, and the radio resource selector unit can be configured to select the single allocation radio resource notified in the designation information from the plurality of candidates for the allocation radio resource.

EFFECT OF THE INVENTION

As described above, according to the present invention, it is possible to provide a mobile communication method, a mobile station and a radio base station which are capable of flexibly setting a timing of a downlink radio resource (PDSCH) allocated in "persistent scheduling".

BRIEF DESCRIPTION OF THE DRAWINGS

FIG. 6 is a flowchart showing operations of a mobile station according to the first embodiment of the present invention.

FIG. 7 is a flowchart showing operations of a radio base station according to the first embodiment of the present invention.

MODES FOR CARRYING OUT THE INVENTION (Configuration of Mobile Communication System According to First Embodiment of Present Invention)

Figure 1:
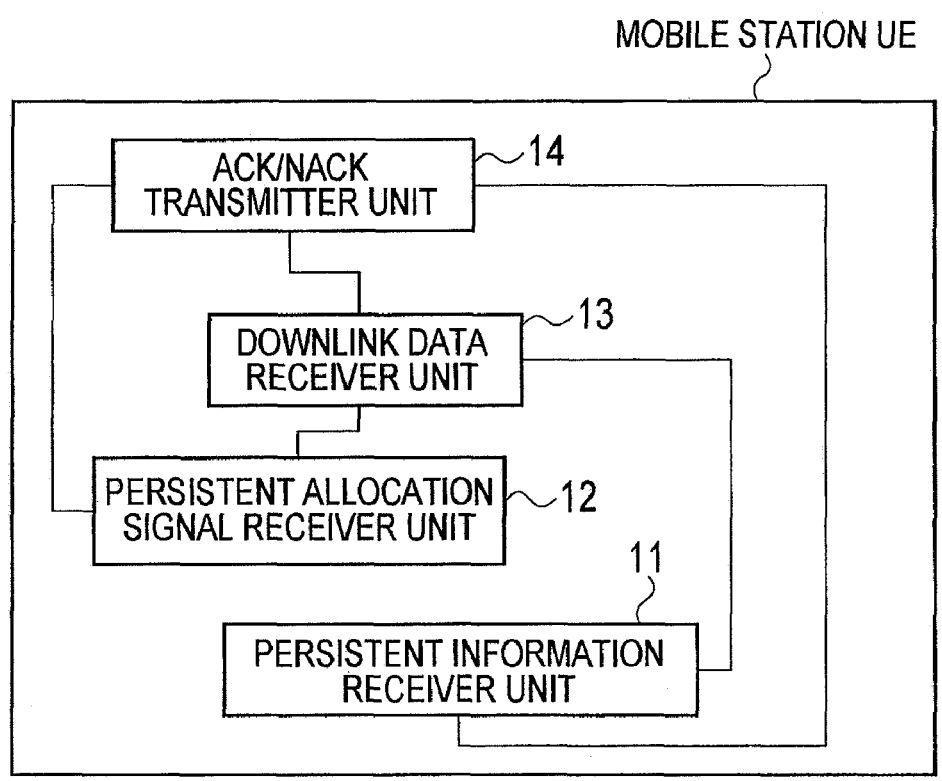
FIG. 1 is a functional block diagram of a mobile station according to a first embodiment of the present invention.
Figure 2:
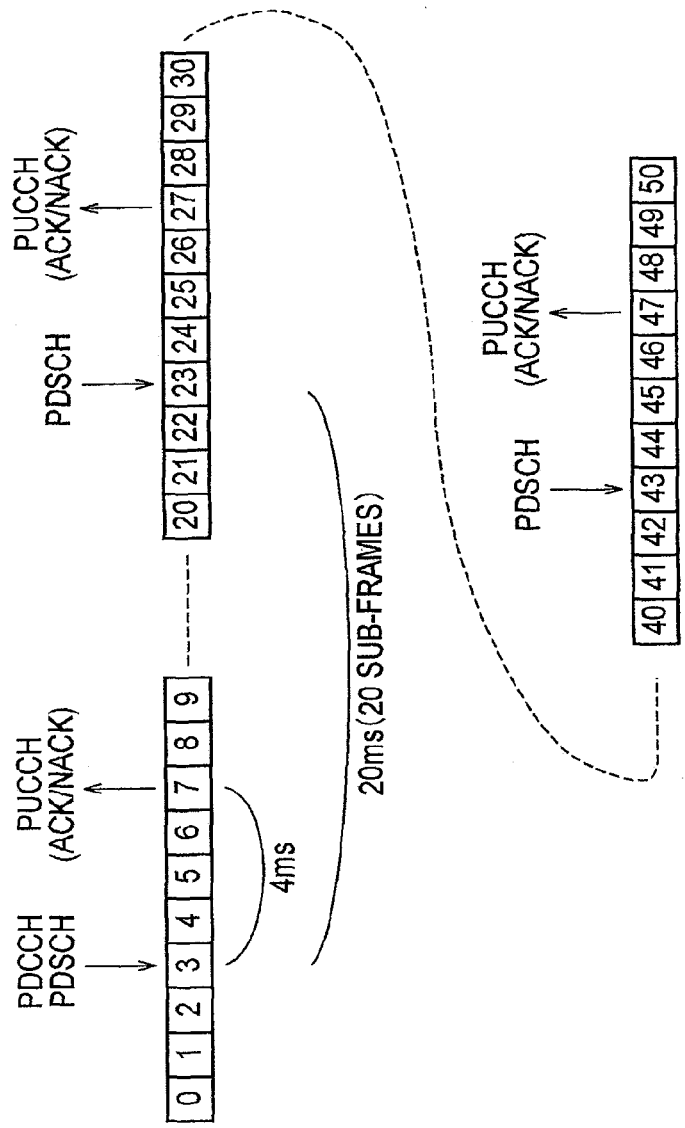
FIG. 2 is a diagram for explaining a scheduling performed in a mobile communication system according to the first embodiment of the present invention.

Referring to FIG. 1 and FIG. 2, a configuration of a mobile communication system according to a first embodiment of the present invention is described. This embodiment is described by citing a mobile communication system of the LTE scheme, but the present invention can also be applied to mobile communication systems to which any other scheme is applied.

In a mobile communication system according to this embodiment, the mobile station UE is configured to start a reception of the downlink data, transmitted from the radio base station eNB, by using a PDSCH (downlink radio resource) persistently allocated in first cycles, at a first allocation starting time, and to transmit acknowledgement information (ACK/NACK) for the downlink data by using an PUCCH (uplink radio resource).

Here, a time difference between a reception timing of the downlink data and a transmission timing of the acknowledgement information is fixed.

As shown in FIG. 1, the mobile station UE includes a persistent information receiver unit 11, a persistent allocation signal receiver unit 12, a downlink data receiver unit 13 and an ACK/NACK transmitter unit 14.

The persistent information receiver unit 11 is configured to receive, from the radio base station eNB, persistent information (persistent communication information) containing the above-described first cycle and first information on the uplink radio resource (PUCCH).

Specifically, the persistent information receiver unit 11 is configured to acquire the above-described persistent information on the basis of an RRC message transmitted by the radio base station eNB.

As will be described later, in the mobile communication system according to the first embodiment of the present invention, the information on the uplink radio resource (PUCCH) includes first information on the uplink radio resource (PUCCH) and second information on the uplink radio resource (PUCCH), and is notified from the radio base station eNB to the mobile station UE.

As will be described later, the second information on the uplink radio resource (PUCCH) is notified by a persistent allocation signal, i.e., a PDCCH which instructs a persistent allocation of the PDSCH (downlink radio resource) for the "persistent scheduling".

Here, the information on the uplink radio resource (PUCCH) represents, for example, a resource block number of a resource block (set of sub-carriers) to which the PUCCH is transmitted, or an identification number used when a plurality of acknowledgement information are multiplexed within one resource block.

For example, an amount of cyclic shift in the multiplexing of the CAZAC sequence cyclic shift or an orthogonal cover number in the block spreading may be designated by such identification number.

Moreover, a part of information out of the information on the uplink radio resource (PUCCH) is notified by the persistent information (persistent communication information), while the rest of the information is notified by the persistent allocation signal as will be described later.

Here, for example, the persistent information is a RRC message and the persistent allocation signal is the PDCCH which instructs a persistent allocation of the PDSCH (downlink radio resource) for the "persistent scheduling".

To be more precise, for example, out of the information on the uplink radio resource (PUCCH), a resource block number of a resource block (set of subcarriers) from which the PUCCH is transmitted may be notified by the persistent information (persistent communication information), while the rest of the information, namely, an identification number used when a plurality of acknowledgment information within one resource block are multiplexed is notified by the persistent allocation signal as will be described later.

Here, for example, the identification number is an amount of cyclic shift in the multiplex of the CAZAC sequence cyclic shift or an orthogonal cover number in the block spreading.

Note that the above-described example is merely an example. The identification number used when a plurality of acknowledgment information within one resource block are multiplexed may be notified by the persistent information (persistent communication information), while the rest of the information, namely, the resource block number of the resource block (set of subcarriers) from which the PUCCH is transmitted may be notified by the persistent allocation signal.

Alternatively, a part of the information on the uplink radio resource (PUCCH) divided by any other methods may be notified by the persistent information (persistent communication information), while the rest of the information may be notified by the persistent allocation signal.

Meanwhile, the information on the uplink radio resource (PUCCH) described above may be in any form as long as the radio resource can be identified.

For example, the information on the uplink radio resource (PUCCH) may be an identification number of a code resource in the code multiplexing described above, an identification number of a frequency resource in the frequency multiplexing, an identification number of a time resource in the time multiplexing, or an identification number of a resource in a hybrid multiplexing of the code multiplexing, the frequency multiplexing and the time multiplexing described above.

In this case as well, a part of the information on the uplink radio resource (PUCCH) is notified by the persistent information (persistent communication information), while the rest of the information is notified by the persistent allocation signal.

To be more precise, for example, when multiplexing is performed in accordance with a hybrid multiplexing of the time multiplexing and the frequency multiplexing, an identification number of a resource in the time multiplexing may be notified by the persistent information (persistent communication information), while an identification number of a resource in the frequency multiplexing may be notified by the persistent allocation signal, and vice versa.

Meanwhile, for example, when multiplexing is performed in accordance with a hybrid multiplexing of the time multiplexing and the code multiplexing, an identification number of a resource in the time multiplexing may be notified by the persistent information (persistent communication information), while an identification number of a resource in the code multiplexing may be notified by the persistent allocation signal, and vice versa.

Meanwhile, for example, when multiplexing is performed in accordance with a hybrid multiplexing of the frequency multiplexing and the code multiplexing, an identification number of a resource in the frequency multiplexing may be notified by the persistent information (persistent communication information), while an identification number of a resource in the code multiplexing may be notified by the persistent allocation signal, and vice versa.

The above-described example shows a case where a part of the information out of the information on the uplink radio resource (PUCCH) is notified by the persistent information (persistent communication information), while the rest of the information is notified by the persistent allocation signal. However, it is not always necessary to define the information to be notified by the persistent information (persistent communication information) and the information to be notified by the persistent allocation signal to be exclusive of each other. These information may partially or entirely overlap each other.

Meanwhile, the above-described information on the uplink radio resource (PUCCH) is supplied to the ACK/NACK transmitter unit 14.

Furthermore, in a mobile communication system of the LTE scheme, information on the first allocation starting time described above is not included in such persistent information.

This is intended to make the radio base station eNB flexibly determine a time resource to allocate the PDSCH (downlink radio resource) described above, whereby utilization efficiency of the radio resource is improved when the "persistent scheduling" is applied.

Meanwhile, it is not necessary that the transmission timing of the uplink radio resource (PUCCH) is contained as the persistent information, since this information is uniquely determined based on the reception timing of the downlink radio resource (PDSCH) described above and a fixedly defined time offset.

For example, transmission timing of the uplink radio resource (PUCCH) may be defined as follows:

(Transmission timing of uplink radio resource (PUCCH))=(reception timing of downlink radio resource PDSCH))+4 ms Meanwhile, the above value of 4 ms is just an example and therefore may be other than 4 ms. Alternatively, 4 ms may be expressed as four sub-frames.

The persistent allocation signal receiver unit 12 is configured to receive the persistent allocation signal from the radio base station eNB.

Specifically, the persistent allocation signal receiver unit 12 is configured to receive, from the radio base station eNB, a PDCCH instructing a persistent allocation of the PDSCH (downlink radio resource) for the "persistent scheduling", as the persistent allocation signal.

For example, the persistent allocation signal receiver unit 12 may be configured to determine, on the basis of RNTI or the like set to PDCCH, whether the PDCCH is a PDCCH to instruct a persistent allocation of the PDSCH (downlink radio resource) for the "persistent scheduling" or a PDCCH to dynamically allocate the PDSCH (downlink radio resource) for normal downlink scheduling.

Meanwhile, the persistent allocation signal receiver unit 12 may be configured to determine, on the basis of one specific bit in the PDCCH, whether the PDCCH is a PDCCH to instruct a persistent allocation of the PDSCH (downlink radio resource) for the "persistent scheduling" or a PDCCH to dynamically allocate the PDSCH (downlink radio resource) for normal downlink scheduling.

Alternatively, when a part of information elements in the PDCCH is configured to indicate whether the PDCCH is a PDCCH to instruct a persistent allocation of the PDSCH (downlink radio resource) for the "persistent scheduling", or a PDCCH to dynamically allocate the PDSCH (downlink radio resource) for normal downlink scheduling, the persistent allocation signal receiver unit 12 may be configured to determine, on the basis of the part of information elements in the above PDCCH, whether the PDCCH is a PDCCH to instruct a persistent allocation of the PDSCH (downlink radio resource) for the "persistent scheduling", or a PDCCH to dynamically allocate the PDSCH (downlink radio resource) for normal downlink scheduling.

Furthermore, the persistent allocation signal contains the second information on the uplink radio resource (PUCCH), in addition to the information to instruct a persistent allocation of the PDSCH (downlink radio resource) for the "persistent scheduling".

Here, the second information on the uplink radio resource (PUCCH) is, for example, a resource block number of the PUCCH (uplink radio resource), or information indicating an identification number used when a plurality of acknowledgment information are multiplexed within one resource block.

To be more precise, as described previously, the second information on the uplink radio resource (PUCCH) is the information other than the information notified by the persistent information (persistent communication information) (first information on uplink radio resource (PUCCH)) out of the information on the uplink radio resource (PUCCH).

In other words, a part of the information out of the information on the uplink radio resource (PUCCH) is notified by the persistent information (persistent communication information), while the rest of the information is notified by the persistent allocation signal.

Here, for example, the persistent information is the RRC message, and the persistent allocation signal is the PDCCH which instructs a persistent allocation of the PDSCH (downlink radio resource) for the "persistent scheduling".

To be more precise, for example, out of the information on the uplink radio resource (PUCCH), the resource block number of the resource block (set of subcarriers) from which the PUCCH is transmitted may be notified by the persistent information (persistent communication information), while the rest of the information, namely, the identification number used when a plurality of acknowledgment information are multiplexed within one resource block may be notified by the persistent allocation signal.

Here, the identification number is, for example, the amount of cyclic shift in the multiplex of CAZAC sequence cyclic shift or the orthogonal cover number in the block spreading.

Note that the above-described example is merely an example. Out of the information on the uplink radio resource (PUCCH), the identification number used when a plurality of acknowledgment information are multiplexed within one resource block may be notified by the persistent information (persistent communication information), while the rest of the information, namely, the resource block number of the resource block (set of subcarriers) from which the PUCCH is transmitted may be notified by the persistent allocation signal.

Alternatively, a part of the information on the uplink radio resource (PUCCH) divided by any other methods may be notified by the persistent information (persistent communication information), while the rest of the information may be notified by the persistent allocation signal.

Details of the second information on the uplink radio resource (PUCCH) will be described later.

Such second information on the uplink radio resource (PUCCH) is given to the ACK/NACK transmitter unit 14.

The downlink data receiver unit 13 is configured to receive the downlink data transmitted via the PDSCH (downlink radio resource) allocated by the PDCCH.

Specifically, the downlink data receiver unit 13 is configured to, when the above-described persistent allocation signal (persistent allocation signal) is received by the persistent allocation signal receiver unit 12, determine a sub-frame which has received such PDCCH as a first allocation starting time described above, and start a persistent reception of the downlink data via the PDSCH (downlink radio resource) for the "persistent scheduling" in the above-described first cycle, at the first allocation starting time.

In the example shown in FIG. 2, since the persistent allocation signal receiver unit 12 has received the above-described persistent allocation signal in the sub-frame #3 via the PDCCH, the downlink data receiver unit 13 is configured to receive the downlink data via the PDSCH (downlink radio resource) mapped to resource blocks (resource block: set of sub-carriers) within the sub-frame #3 designated by the PDCCH.

Furthermore, the downlink data receiver unit 13 is configured to start a reception of the downlink data via a PDSCH (downlink radio resource) mapped to the resource blocks (resource block: set of sub-carriers) designated by the PDCCH in the cycle of 20 ms, at the sub-frame #3.

That is, the downlink data receiver unit 13 is configured to receive the downlink data via the PDSCH (downlink radio resource) mapped to resource blocks (resource block: set of sub-carriers) designated by the PDCCH in the sub-frames #3, #23, #43, . . . .

The ACK/NACK transmitter unit 14 is configured to receive, from the persistent information receiver unit 11, the first information on the uplink radio resource (PUCCH) notified by the persistent information.

In addition, the ACK/NACK transmitter unit 14 is configured to receive, from the persistent information receiver unit 12, the second information on the uplink radio resource (PUCCH) notified by the persistent allocation signal.

The ACK/NACK transmitter unit 14 is configured to determine the uplink radio resource (PUCCH) on the basis of the first information on the uplink radio resource (PUCCH) notified by the persistent information and the second information on the uplink radio resource (PUCCH) notified by the persistent allocation signal, and to transmit acknowledgment information (ACK/NACK) corresponding to the received downlink data via the uplink radio resource (PUCCH). The acknowledgment information (ACK/NACK) is determined based on a decoding result of the downlink data by the downlink data receiver unit 13.

Figure 3:
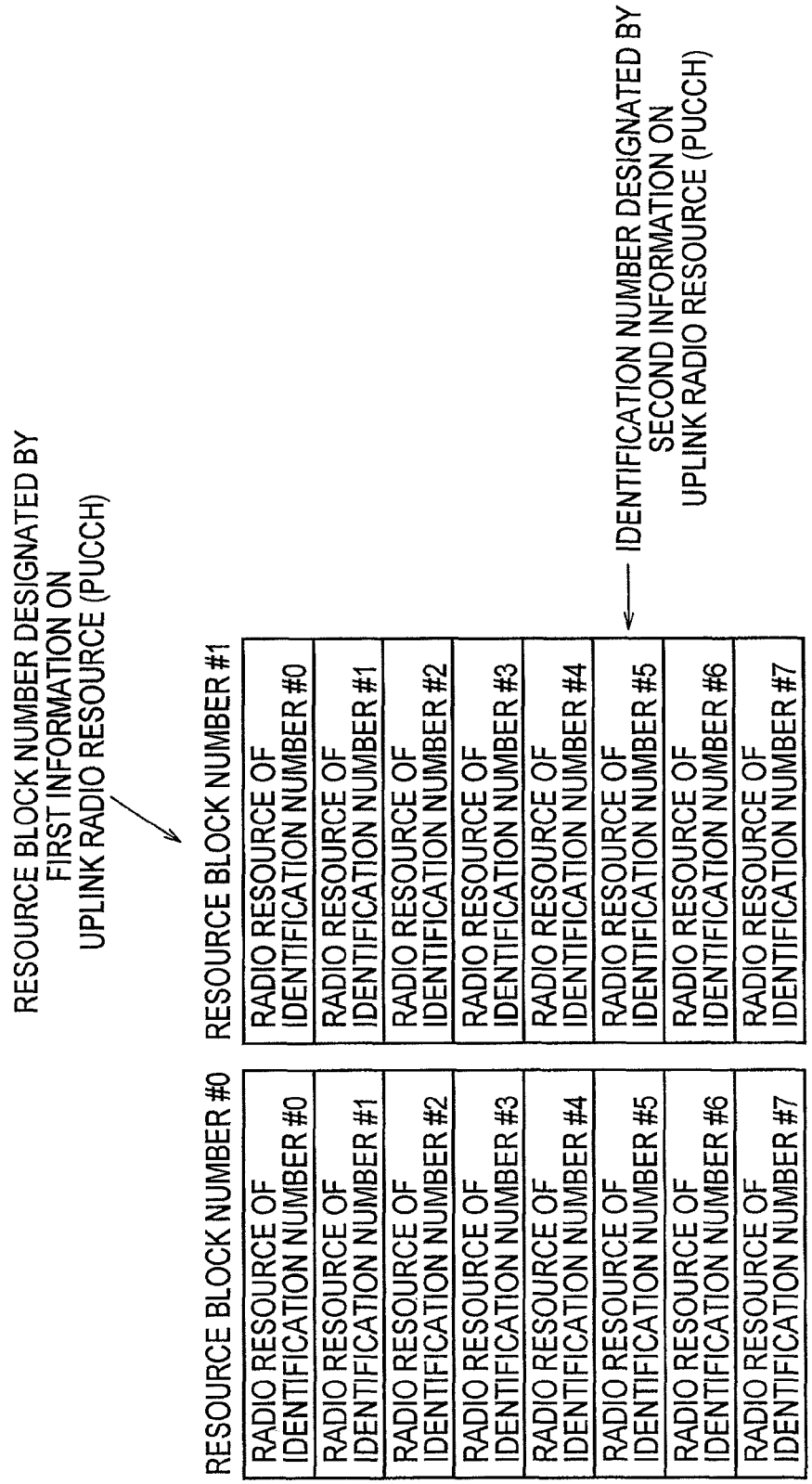
FIG. 3 is a diagram for explaining a method of determining an uplink radio resource (PUCCH) performed in a mobile communication system according to the first embodiment of the present invention.

By using FIG. 3, an example is shown of a method of determining the uplink radio resource (PUCCH) on the basis of the above-described first information on the uplink radio resource (PUCCH) notified by the persistent information and the second information on the uplink radio resource (PUCCH) notified by the persistent allocation signal.

In FIG. 3, two resource blocks are defined as the uplink radio resource (PUCCH), and #0 and #1 are defined as resource block numbers thereof.

Meanwhile, eight radio resources are defined in each resource block, and #0, #1, #2, . . . , #7 are defined as identification numbers thereof. For example, these identification numbers may be the above-described identification numbers when a plurality of the acknowledgment information are multiplexed within one resource block.

Here, consideration is made of a case where the resource block number #1 is designated by the first information on the uplink radio resource (PUCCH) notified by the persistent information and the identification number #5 is designated by the second information on the uplink radio resource (PUCCH) notified by the persistent allocation signal.

In this case, the ACK/NACK transmitter unit 14 determines the radio resource defined by the resource block number #1 and the identification number #5 inside that resource block as the radio resource for transmitting the acknowledgment information (ACK/NACK) corresponding to the received downlink data, i.e., the uplink radio resource (PUCCH).

Specifically, the radio resource for transmitting the acknowledgment information (ACK/NACK) corresponding to the received downlink data, i.e., the uplink radio resource (PUCCH) is determined based on the first information on the uplink radio resource (PUCCH) notified by the persistent information and the second information on the uplink radio resource (PUCCH) notified by the persistent allocation signal.

In other words, a part of the information on the uplink radio resource (PUCCH) is notified by the persistent information, while the rest of the information is notified by the persistent allocation signal, and the uplink radio resource (PUCCH) is determined based on both of the information.

In the above-described example, the resource block number is notified by the above-described first information on the uplink radio resource (PUCCH), while the identification information in one resource block is notified by the above-described second information on the uplink radio resource (PUCCH). Instead, the identification information in one resource block may be notified by the above-described first information on the uplink radio resource (PUCCH), while the resource block number may be notified by the above-described second information on the uplink radio resource (PUCCH).

Alternatively, a part of the information on the uplink radio resource (PUCCH) divided by any other methods may be notified as the first information on the uplink radio resource (PUCCH), while the rest of the information may be notified as the second information on the uplink radio resource (PUCCH).

Here, the identification information in one resource block is, for example, the amount of cyclic shift in the multiplexing of CAZAC sequence cyclic shift or the orthogonal cover number in the block spreading.

Meanwhile, a plurality of identification numbers for identifying resources other than those described above may be defined, and a part of the plurality of identification numbers may be notified by the above-described first information on the uplink radio resource (PUCCH), while the rest of the plurality of identification numbers may be notified by the above-described second information on the uplink radio resource (PUCCH).

Although eight radio resources are defined in each resource block in the above-described example, a similar method of determining the uplink radio resource (PUCCH) is applicable when more or less than eight radio resources are defined.

Meanwhile, although two resource blocks are defined in the above-described example, it is also possible to define a single resource block or three or more resource blocks.

Meanwhile, in the above-described example, the uplink radio resource (PUCCH) is determined based on the first information on the uplink radio resource (PUCCH) notified by the persistent information and the second information on the uplink radio resource (PUCCH) notified by the persistent allocation signal. Instead, it is possible to apply a configuration in which the first information on the uplink radio resource (PUCCH) is not notified by the persistent information and the second information on the uplink radio resource (PUCCH) is notified by the PDCCH. In this configuration, the uplink radio resource (PUCCH) may be determined only by the second information on the uplink radio resource (PUCCH).

In this case, there is a disadvantage that the number of bits for the information on the uplink radio resource (PUCCH) is increased, while there is an advantage that the uplink radio resource (PUCCH) can be set up more flexibly.

In the above-described example, for example, the second information may be at lease one of information such as a resource block number #1 and information such as an identification number #5.

Specifically, the identification number used when the plurality of acknowledgment information are multiplexed within one resource block or the resource block number of the PUCCH may be notified by the PDCCH.

Incidentally, the second information on the uplink radio resource (PUCCH) is defined as a part of information elements to be notified by a persistent allocation signal (persistent allocation signal).

Here, for example, when a signal format of the persistent allocation signal is the same as a signal format of the dynamic allocation signal in the dynamic scheduling, bits of the power control command used for transmission power control in the dynamic allocation signal may be used as the second information on the uplink radio resource (PUCCH).

In the persistent scheduling, there is only a little significance to notify the power control command used for transmission power control. Accordingly, the bits of the command used for the transmission power control can be used as the second information on the uplink radio resource (PUCCH).

Alternatively, when the signal format of the persistent allocation signal is the same as the signal format of the dynamic allocation signal in the dynamic scheduling, bits designating the "redundancy version" in the dynamic allocation signal may be used as the second information on the uplink radio resource (PUCCH).

In the persistent scheduling, there is only a little significance to notify the bits for designating the redundancy version. Accordingly, the bits for designating the redundancy version can be used as the second information on the uplink radio resource (PUCCH).

In this case, the redundancy version is set to a predetermined redundancy version.

Alternatively, when the signal format of the persistent allocation signal is the same as the signal format of the dynamic allocation signal in the dynamic scheduling, bits designating the "MCS (Modulation and Coding Scheme)" in the dynamic allocation signal may be used as the second information on the uplink radio resource (PUCCH).

Since the number of bits for designating such MCS in the persistent scheduling is smaller compared with the dynamic scheduling, a part or all of such bits for designating the MCS may be used as the second information on the uplink radio resource (PUCCH).

Alternatively, when the signal format of the persistent allocation signal is the same as the signal format of the dynamic allocation signal in the dynamic scheduling, a bit of a "new data indicator" in the dynamic allocation signal may be used as the second information on the uplink radio resource (PUCCH).

Alternatively, when the signal format of the persistent allocation signal is the same as the signal format of the dynamic allocation signal in the dynamic scheduling, a part or all of bits for designating the "RB assignment" in the dynamic allocation signal may be used as the second information on the uplink radio resource (PUCCH).

Since the number of bits for designating such RB assignment in the persistent scheduling is smaller compared with the dynamic scheduling, a part or all of such bits for designating the RB assignment may be used as the second information on the uplink radio resource (PUCCH).

Instead, when the signal format of the persistent allocation signal is to the same as the signal format of the dynamic allocation signal in the dynamic scheduling, at least any one of the bit of the power control command, the bit for designating the "redundancy version", the bits for designating the "MCS", the bits of the "new data indicator", and the bits for designating the "RB assignment" can be used as the second information on the uplink radio resource (PUCCH).

In this case, since the resource can be designated based on a plurality of information elements in the PDCCH, it is possible to perform a resource allocation of the PUCCH (uplink radio resource) more flexibly.

If the first information on the uplink radio resource (PUCCH) is not notified by the persistent information and only the second information on the uplink radio resource (PUCCH) is notified by the PDCCH, the bits of the power control command, the bits for designating the "redundancy version", the bits for designating the "MCS", the bits of the "new data indicator", and the bits for designating the "RB assignment" may be used as the signal for notifying the information on the uplink radio resource (PUCCH).

Here, the information on the uplink radio resource (PUCCH) is the identification number used when the plurality of acknowledgment information are multiplexed within one resource block or the resource block number of the PUCCH, for example.

As described previously, identification as to whether the received PDCCH is the persistent allocation signal (persistent allocation signal) or the dynamic allocation signal is performed based on RNTI or the like which is set in the PDCCH.

In other words, the mobile station UE regards the PDCCH as the dynamic allocation signal when the CRC on the RNTI of the dynamic scheduling is "OK", and regards the PDCCH as the persistent allocation signal (persistent allocation signal) when the CRC on the RNTI of the persistent scheduling is "OK".

Then, when regarding the PDCCH as the persistent allocation signal (persistent allocation signal), the mobile station UE performs a reception of the signal while regarding that any of the bits of the power control command, the bits for designating the "redundancy version", the bits for designating the "MCS", the bits of the "new data indicator", and the bits for designating the "RB assignment" is used as the second information on the uplink radio resource (PUCCH).

Note that, a timing when the acknowledgement information (ACK/NACK) for the downlink data received is transmitted via the uplink radio resource (PUCCH) is a timing uniquely determined based on the reception timing of the downlink radio resource (PDSCH) and the fixedly defined time offset, as described above.

Furthermore, in the example described above, although the acknowledgement information (ACK/NACK) for the PDSCH (downlink data) is transmitted by the PUCCH, the acknowledgement information for the downlink data may be transmitted by being multiplexed with PUSCH when a physical uplink shared channel for transmitting uplink data is transmitted in a sub-frame in which the acknowledgment information (ACK/NACK) is transmitted.

Alternatively, when the physical uplink shared channel for transmitting uplink data is allocated in the sub-frame in which the acknowledgement information (ACK/NACK) is transmitted, the acknowledgement information for such downlink data may be transmitted as partial information within the PUSCH.

On the other hand, the radio base station eNB according to the present invention is configured to notify, to the mobile station UE, the first cycle and the information on the uplink radio resource (PUCCH).

Description of such information on the uplink radio resource (PUCCH) is omitted, as it is the same as the description given for the mobile station UE.

Figure 4:
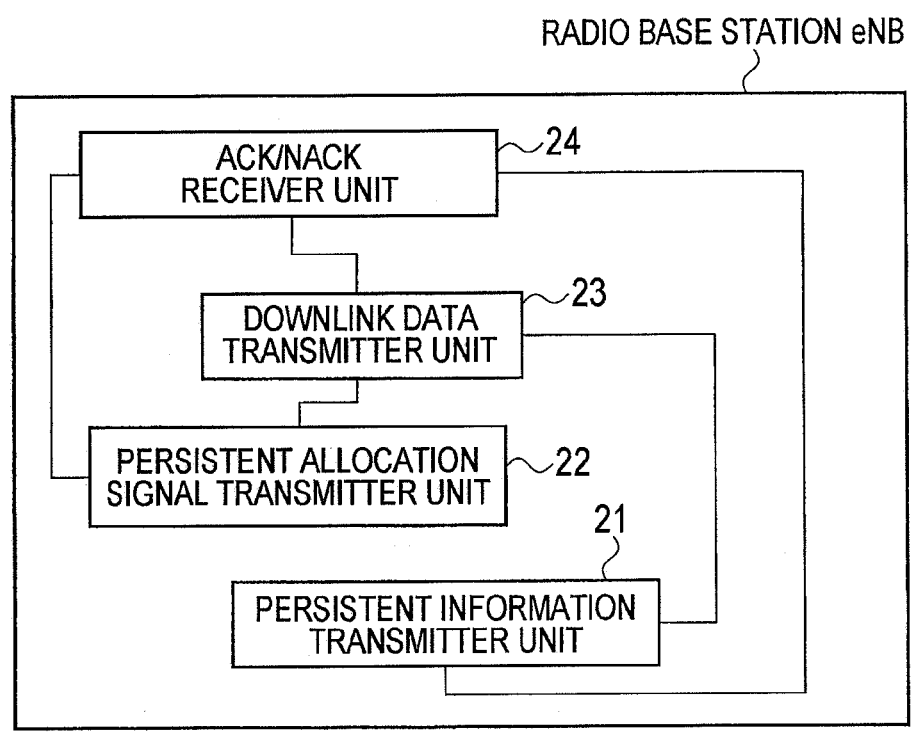
FIG. 4 is a functional block diagram of a radio base station according to the first embodiment of the present invention.

As shown in FIG. 4, the radio base station eNB includes a persistent information transmitter unit 21, a persistent allocation signal transmitter unit 22, a downlink data transmitter unit 23 and an ACK/NACK receiver unit 24.

The persistent information transmitter unit 21 is configured to transmit, to the mobile station UE, the persistent information (persistent communication information) containing the first cycle and the first information on the uplink radio resource (PUCCH).

Specifically, the persistent information transmitter unit 21 is configured to notify, to the mobile station UE, the above-described persistent information by using an RRC message.

Description of the first information on the uplink radio resource (PUCCH) is omitted, as it is the same as the description given for the mobile station UE. Meanwhile, such first information on the uplink radio resource (PUCCH) is given to the ACK/NACK receiver unit 24.

The persistent allocation signal transmitter unit 22 is configured to transmit, to the mobile station UE, a persistent allocation signal.

Specifically, the persistent allocation signal transmitter unit 22 is configured to transmit, to the mobile station UE, the PDCCH instructing a persistent allocation of the PDSCH (downlink radio resource) for the "persistent scheduling", as a persistent allocation signal.

Note that, such a persistent allocation signal contains the information to instruct a persistent allocation of the PDSCH (downlink radio resource) for the "persistent scheduling", and additionally contains second information on the uplink radio resource (PUCCH) to make notification of the resource block number of the PUCCH (uplink radio resource) and the identification number used when a plurality of acknowledgement information are multiplexed within one resource block.

Here, as described previously, it is also possible to execute processing in which the information on the uplink radio resource (PUCCH) is not notified by the persistent information and the second information on the uplink radio resource (PUCCH) is notified by the PDCCH.

The second information on the uplink radio resource (PUCCH) is supplied to the ACK/NACK receiver unit 24.

Note that, the persistent allocation signal transmitter unit 22 may be configured to determine contents of the above-described second information on the uplink radio resource (PUCCH) in such a manner that the radio resource of the acknowledgement information for the downlink data does not contend with radio resources of the acknowledgement information transmitted from other mobile stations.

Figure 5:
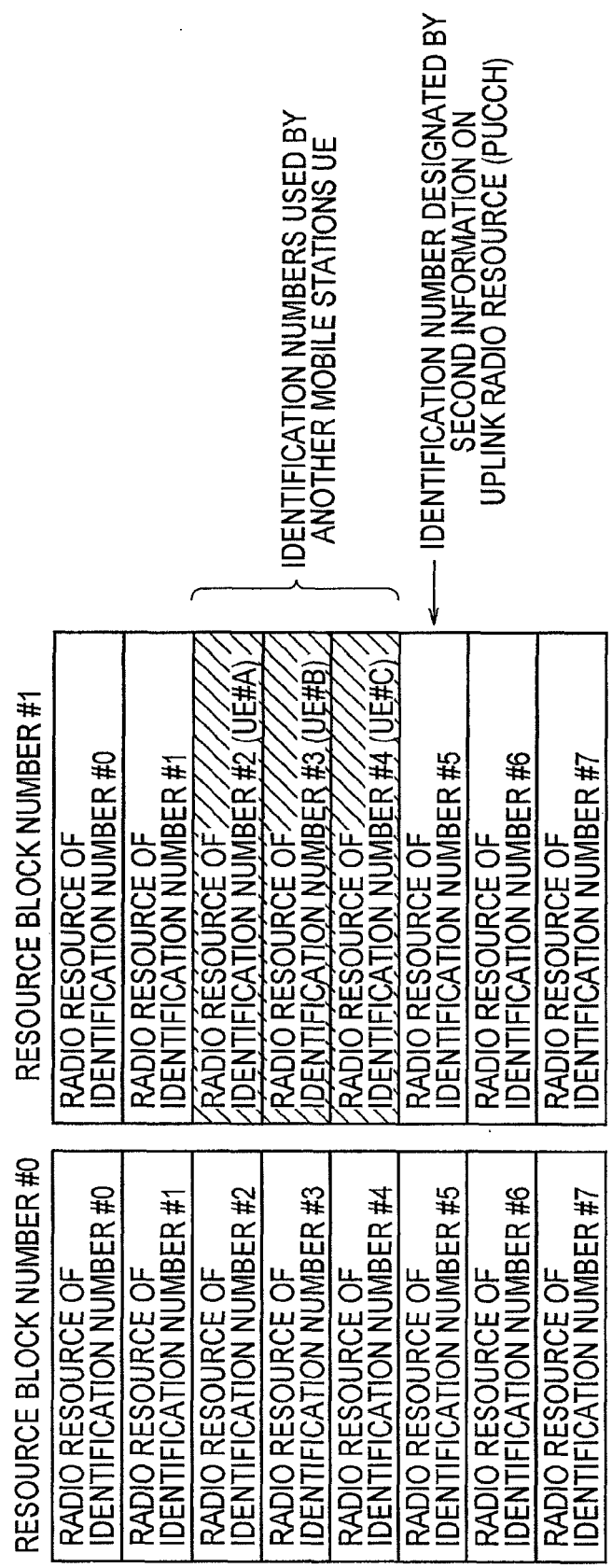
FIG. 5 is a diagram for explaining a method of determining contents of second information on the uplink radio resource (PUCCH) performed in the mobile communication system according to the first embodiment of the present invention.
Figure 8:
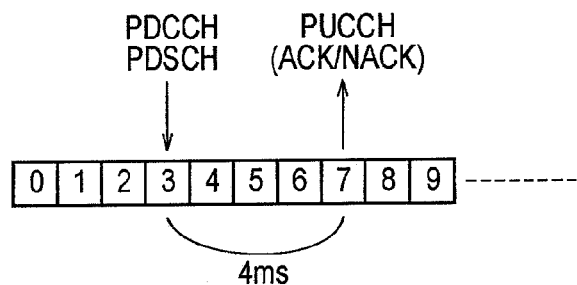
FIG. 8 is a diagram for setting up a scheduling in a general LTE mobile communication system.
Figure 9:
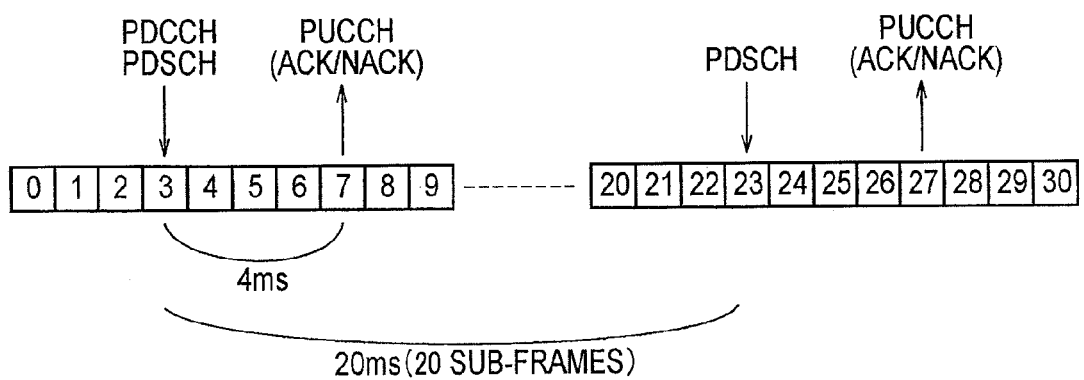
FIG. 9 is a diagram for setting up a scheduling in a general mobile communication system of the LTE scheme.

By using FIG. 5, one example of a method for determining the contents of the second information on the uplink radio resource (PUCCH) in such a manner that the radio resource of the acknowledgement information for the downlink data does not contend with the radio resources of the acknowledgement information transmitted from the other mobile stations.

In FIG. 5, two resource blocks are defined as the uplink radio resource (PUCCH), and #0 and #1 are defined as resource block numbers thereof. Meanwhile, eight radio resources are defined in each resource block, and #0, #1, #2, . . . , #7 are defined as identification numbers thereof.

Here, an assumption is made that the resource block number #1 is notified by the persistent information as the first information on the uplink radio resource (PUCCH).

Meanwhile, at a transmission timing of this acknowledgment information, the radio resources corresponding to the identification numbers #2, #3, and #4 in the resource block number #1 have already been used by a mobile station UE#A, a mobile station UE#B, and a mobile station UE#C, respectively.

In this case, when the uplink radio resource (PUCCH) to be transmitted from the mobile station UE by using the second information on the uplink radio resource (PUCCH) contend with the uplink radio resources (PUCCH) to be transmitted from the mobile stations UE#A, UE#B, and UE#C, transmission characteristics of the uplink radio resources (PUCCH) of the contending mobile stations UE and the mobile station UE will be significantly deteriorated.

Accordingly, in order to avoid the above-described contention, the persistent allocation signal transmitter unit 22 determines, for example, to set the identification number of the uplink radio resource (PUCCH) of the mobile station UE to #5 by use of the second information on the uplink radio resource (PUCCH). Here, the determination to set the identification number to #5 is merely an example and it is also possible to set the identification number to #6 or #1 as long as no contention occurs.

Alternatively, when the processing in which "the first information on the uplink radio resource (PUCCH) is not notified by the persistent information and only the second information on the uplink radio resource (PUCCH) is notified by the PDCCH" is performed as described above, the persistent allocation signal transmitter unit 22 may determine to notify the "resource block number #1" and the "identification number #5" as the information on the uplink radio resource in order to avoid the above-mentioned contention.

Here, it is also possible to notify, for example, the identification number #0 or #1 or the resource block #0 instead of the "identification #5" as long as no contention occurs.

The downlink data transmitter unit 23 is configured to transmit downlink data transmitted via the PDSCH (downlink radio resource) allocated by the PDCCH.

Specifically, the downlink data transmitter unit 23 is configured to, when the above-described persistent allocation signal (persistent allocation signal) is transmitted by the persistent allocation signal transmitter unit 22, determine a subframe in which such PDCCH has been transmitted as the above-described first allocation starting time, and to start a transmission of the downlink data via the PDSCH (downlink radio resource) for the "persistent scheduling" persistently in the above-described first cycle, at the first allocation starting time.

The ACK/NACK receiver unit 24 is configured to receive, from the persistent information transmitter unit 21, the first information on the uplink radio resource (PUCCH) notified by the persistent information.

Moreover, the ACK/NACK receiver unit 24 receives, from the persistent allocation signal transmitter unit 22, the second information on the uplink radio resource (PUCCH) notified by the persistent allocation signal.

The ACK/NACK receiver unit 24 is configured to determine the uplink radio resource (PUCCH) on the basis of the first information on the uplink radio resource (PUCCH) notified by the persistent information and the second information on the uplink radio resource (PUCCH) notified by the persistent allocation signal, and to receive the acknowledgment information (ACK/NACK) for the transmitted downlink data via the uplink radio resource (PUCCH).

Here, a method of determining the uplink radio resource (PUCCH) on the basis of the first information on the uplink radio resource (PUCCH) notified by the persistent information and the second information on the uplink radio resource (PUCCH) notified by the persistent allocation signal is the same as the description in the mobile station UE and will therefore be omitted.

(Operations of Mobile Communication System According to First Embodiment of Present Invention)

Operations of the mobile communication system according to the first embodiment of the present invention will be described with reference to FIG. 6.

As shown in FIG. 6, in step S101, the mobile station UE receives, from the radio base station eNB, the persistent information including the above-described first cycle and the first information on the uplink radio resource (PUCCH) through an RRC message or the like. Then, the mobile station UE acquires the first information on the uplink radio resource (PUCCH).

In step S102, the mobile station UE receives the persistent allocation signal (persistent allocation signal) transmitted from the radio base station eNB via the PDCCH. Then, the mobile station UE acquires the second information on the uplink radio resource (PUCCH) included in the persistent allocation signal.

In step S102, the mobile station UE determines a reception timing of the persistent allocation signal as the first allocation starting time.

In step S103, the mobile station UE determines the uplink radio resource (PUCCH) on the basis of the first information on the uplink radio resource (PUCCH) and the second information on the uplink radio resource (PUCCH).

Here, for example, the first information on the uplink radio resource (PUCCH) may be the resource block number of the PUCCH, while the second information on the uplink radio resource (PUCCH) may be the orthogonal cover sequence number in the block spreading or the identification number designating the amount of cyclic shift in the CAZAC sequence.

A method of determining the uplink radio resource (PUCCH) on the basis of the first information on the uplink radio resource (PUCCH) and the second information on the uplink radio resource (PUCCH) is similar to the above-described method of determining the uplink radio resource (PUCCH) which has already been described in conjunction with the above-described ACK/NACK transmitter unit 14 of the mobile station UE.

Here, when the processing in which "the first information on the uplink radio resource (PUCCH) is not notified by the persistent information and only the second information on the uplink radio resource (PUCCH) is notified by the PDCCH" is performed as described above, the uplink radio resource (PUCCH) is determined in step S103 on the basis of the second information on the uplink radio resource (PUCCH) mapped in the PDCCH.

In step S104, the mobile station UE receives the downlink data via the PDSCH (downlink radio resource) for the "persistent scheduling" designated by the persistent allocation signal at a reception timing of the "persistent scheduling" calculated from the first allocation starting time and the first cycle.

In step S105, the mobile station UE transmits the acknowledgement information (ACK/NACK) for the downlink data received in step S104 via the uplink radio resource (PUCCH) determined in step S103.

Then, the mobile station UE receives downlink data via the PDSCH (downlink radio resource) persistently allocated in the first cycle (step S104), and transmits the acknowledgement information (ACK/NACK) for the downlink data via the PUCCH (uplink radio resource) (step S105).

Referring to FIG. 7, operations of the radio base station according to the first embodiment of the present invention is described.

As shown in FIG. 7, in step S201, the radio base station eNB transmits, to the mobile station UE, the persistent information including the above described first cycle and the first information on the uplink radio resource (PUCCH) through an RRC message or the like.

In step S202, the radio base station eNB determines to transmit, to the mobile station UE, the persistent allocation signal (persistent allocation signal) to be transmitted via the PDCCH.

In step S203, the radio base station eNB determines the second information on the uplink radio resource (PUCCH) to be included in the persistent allocation signal (persistent allocation signal) so as to avoid contention with the uplink radio resources (PUCCH) of other mobile stations UE.

Here, for example, the first information on the uplink radio resource (PUCCH) may be the resource block number of the PUCCH, while the second information on the uplink radio resource (PUCCH) may the orthogonal cover sequence number in the block spreading or the identification number designating the amount of cyclic shift in the CAZAC sequence.
(Operation and Effect of Mobile Communication System According to First Embodiment of Present Invention)

According to the mobile communication system of the first embodiment of the present invention, when the timing to allocate the downlink radio resource (PDSCH) is changed, it is possible to allocate the uplink radio resource (PUCCH) in a way that the uplink radio resource (PUCCH) does not contend with the uplink radio resources (PUCCH) of other mobile stations UE. Therefore, it is possible to flexibly set up a time point to allocate the downlink radio resource (PDSCH) in the "persistent scheduling" and thereby to improve radio utilization efficiency.
(Modification)

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio resource selecting method of semi-persistently selecting a radio resource to be allocated to an uplink acknowledgement signal indicating a reception state of a persistently allocated downlink signal from a plurality of radio resources defined by frequencies and codes, the radio resource selecting method comprising the steps of:
(A) designating a plurality of radio resources by first information on uplink radio resource;
(B) designating a single radio resource by second information on uplink radio resource; and
(C) selecting the single allocation radio resource designated by the second information among the plurality of radio resources designated by the first information, as a radio resource to be allocated to the uplink acknowledgement signal.

2. The radio resource selecting method according to claim 1, wherein in the step (B), an unused radio resource is designated by the second information.

3. The radio resource selecting method according to claim 1, wherein
in the step (A), identification information of a resource block formed by the plurality of radio resources is designated by the first information; and
in the step (B), identification information of the single allocation radio resource is designated by the second information.

4. The radio resource selecting method according to claim 1, wherein
the first information is notified by an RRC message; and
the second information is notified via a PDCCH.

5. The radio resource selecting method according to claim 1, wherein
the second information is notified by bits of command to be used in transmission power control.

6. A radio base station configured to semi-persistently select a radio resource to be allocated to an uplink acknowledgement signal indicating a reception state of a persistently allocated downlink signal from a plurality of radio resources defined by frequencies and codes, the radio base station comprising:
a first designation notification unit configured to designate a plurality of radio resources by first information on uplink radio resource; and
a second designation notification unit configured to designate a single radio resource by second information on uplink radio resource among the plurality of radio resources.

7. The radio base station according to claim 6, wherein
the first designation notification unit is configured to designate identification information of a resource block formed by the plurality of radio resources by the first information; and
the second designation notification unit is configured to designate identification information of the single allocation radio resource among the plurality of radio resources by the second information.

8. The radio base station according to claim 6, wherein
the first designation notification unit is configured to notify the first information by an RRC message; and
the second designation notification unit is configured to notify the second information via a PDCCH.

9. The radio base station according to claim 6, wherein
the second designation notification unit is configured to designate an unused radio resource by the second information.

10. The radio base station according to claim 6, wherein
the second designation notification unit is configured to notify the second information by bits of command to be used in transmission power control.

11. A mobile station used in a mobile communication system in which a radio base station semi-persistently selects a radio resource to be allocated to an uplink acknowledgement signal indicating a reception state of a persistently allocated downlink signal from a plurality of radio resources defined by frequencies and codes, the mobile station comprising:

a first receiver unit configured to receive first information on uplink radio resource from the radio base station;

a second receiver unit configured to receive second information on uplink radio resource from the radio base station; and a radio resource selector unit configured to select a single radio resource designated by the second information among the plurality of radio resources designated by the first information, as a radio resource to be allocated to the uplink acknowledgement signal.

12. The mobile station according to claim 11, wherein
the first information designates identification information of a resource block formed by the plurality of radio resources; and
the second information designates identification information of the single radio resource.

13. The mobile station according to claim 11, wherein
the first receiver unit is configured to receive the first information via an RRC message; and
the second receiver unit is configured to receive the second information via a PDCCH.

14. The mobile station according to claim 11, wherein
the second receiver unit is configured to receive the second information via bits of command to be used in transmission power control.

* * * * *